(12) United States Patent
Lu et al.

(10) Patent No.: US 8,551,587 B2
(45) Date of Patent: Oct. 8, 2013

(54) UNIAXIALLY SHRINKABLE, BIAXIALLY ORIENTED POLYPROPYLENE FILMS

(71) Applicant: ExxonMobil Oil Corporation, Baytown, TX (US)

(72) Inventors: Pang-Cha Lu, Pittsford, NY (US); Benoit Ambroise, Hachy (BE)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 13/628,962

(22) Filed: Sep. 27, 2012

(65) Prior Publication Data

US 2013/0115398 A1    May 9, 2013

Related U.S. Application Data

(60) Provisional application No. 61/555,588, filed on Nov. 4, 2011.

(51) Int. Cl.
*B65B 53/00* (2006.01)

(52) U.S. Cl.
USPC ..... 428/34.9; 428/35.7; 428/513; 264/173.15

(58) Field of Classification Search
USPC ............ 428/35.7, 34.9, 500, 515; 264/173.15
See application file for complete search history.

(56) References Cited

U.S. PATENT DOCUMENTS

| | | | |
|---|---|---|---|
| 5,691,043 A | 11/1997 | Keller et al. | |
| 6,113,996 A | 9/2000 | Amon et al. | |
| 6,670,423 B2 * | 12/2003 | Hausmann | 525/216 |
| 6,908,687 B2 | 6/2005 | Mendes et al. | |
| 7,052,750 B2 | 5/2006 | Niepelt | |
| 7,244,507 B2 * | 7/2007 | Arthurs et al. | 428/516 |
| 8,057,911 B2 * | 11/2011 | Lohr | 428/515 |
| 8,383,246 B2 * | 2/2013 | Frauenhofer et al. | 428/515 |
| 2003/0068453 A1 * | 4/2003 | Kong | 428/35.2 |
| 2005/0214557 A1 | 9/2005 | Arthurs et al. | |
| 2006/0159878 A1 * | 7/2006 | Wakai et al. | 428/34.9 |
| 2008/0248229 A1 | 10/2008 | Pieban et al. | |
| 2009/0220757 A1 | 9/2009 | Patel et al. | |
| 2011/0135916 A1 * | 6/2011 | Lu | 428/336 |
| 2011/0212338 A1 | 9/2011 | Ambroise | |
| 2011/0268979 A1 * | 11/2011 | Ambroise et al. | 428/516 |
| 2012/0196061 A1 * | 8/2012 | Weisinger | 428/35.2 |
| 2012/0263960 A1 * | 10/2012 | Song et al. | 428/461 |
| 2012/0308789 A1 * | 12/2012 | Lockhart et al. | 428/203 |
| 2013/0052441 A1 * | 2/2013 | Lu | 428/220 |
| 2013/0115398 A1 * | 5/2013 | Lu et al. | 428/35.7 |

FOREIGN PATENT DOCUMENTS

| | | |
|---|---|---|
| EP | 0 983 138 | 3/2000 |
| EP | 1 300 238 | 4/2003 |
| EP | 1 423 408 | 6/2004 |
| EP | 1 632 343 | 3/2006 |
| EP | 1878567 | 1/2008 |
| WO | WO 2005/097493 | 10/2005 |
| WO | WO 2009/142805 | 11/2009 |

* cited by examiner

*Primary Examiner* — N. Edwards
(74) *Attorney, Agent, or Firm* — Kevin M. Faulkner

(57) ABSTRACT

Provided is a polypropylene film, and a method of making the film, the film comprising at least one core layer sandwiched between at least two skin layers, the layers comprising a core layer comprising polypropylene and within the range of from 20 wt % to 50 wt %, by weight of the materials in the core layer, of a propylene-α-olefin elastomer having within the range of from 5 wt % to 25 wt % α-olefin derived units, by weight of the copolymer; and skin layers comprising one or more polymers having a melting point within the range of from 125° C. to 160° C., a Shore D Hardness within the range of from 55 to 70, and a Flexural Modulus of at least 600 MPa; wherein the film has a Haze value of less than 10%, the film being biaxially oriented but shrinkable substantially only in the MD.

24 Claims, No Drawings

UNIAXIALLY SHRINKABLE, BIAXIALLY ORIENTED POLYPROPYLENE FILMS

CROSS-REFERENCE TO RELATED APPLICATION

This application claims the benefit of and priority to U.S. Ser. No. 61/555,588, filed Nov. 4, 2011 which is incorporated by reference.

FIELD OF THE INVENTION

The present disclosure relates to uniaxially shrinkable and biaxially oriented polypropylene films, and more particularly to roll-on-roll-shrink-on films based on a polypropylene core and a modifying soft polymer that shrink in substantially only in the machine direction.

BACKGROUND OF THE INVENTION

Shrink labels fall into two categories: roll-on-shrink-on ("ROSO") labels and sleeve labels. ROSO labels are supplied from a reel, cut into sheets, applied around a container, and seamed around the container during the labeling step using hot melt to form a seam, with the machine direction (MD) of the film extending circumferentially around the container. ROSO label films primarily shrink in the MD direction and generally employ biaxially oriented polypropylene (BOPP) films.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. The resulting shrinkage of the film results in an aesthetically pleasing transparent wrapping which conforms to the contour of the product while providing the usual functions required of packaging materials such as protection of the product from loss of components, pilferage, or damage due to handling and shipment. Typical items wrapped in polyolefin shrink films are toys, games, sporting goods, stationery, greeting cards, hardware and household products, office supplies and forms, foods, phonograph records, and industrial parts.

In certain situations, it is desirable to affect shrinkage along a single axis without substantial shrinkage in the cross-direction. For example, in the process of labeling bottles or cans by shrinking a tube or lap-sealed sleeve of heat shrinkable material, if the film shrinks parallel to the container axis, the label may not be placed in the right position but rather placed above or below the desired position upon shrinkage.

In order to obtain uniaxially shrinkable materials, it is possible to employ uniaxially oriented materials, i.e., materials which are oriented in only one direction. However, uniaxially oriented film can lack the requisite strength and toughness necessary for use in such applications. Inasmuch as biaxially oriented films exhibit desirable strength and tear resistance in both directions of orientation, it would be desirable to obtain a uniaxially heat shrinkable film which is biaxially oriented but substantially stable in the transverse direction (TD). In labeling applications, the shrinkable direction usually corresponds to the MD of the film manufacturing process.

Oriented polypropylene films are particularly desirable, but crystalline polypropylene alone will become very rigid after the normal MD/TD orientation. When going through a second orientation, an oriented polypropylene film will typically break (tear/snap by MD force). On the other hand, if the film starts off (room temperature) too soft it will become too soft even after the second MD orientation, giving low stability. Thus, there is a balance in the level of softness of the polypropylene film that is desirable, but difficult to reach. The inventor, however, has discovered that certain additives and processes can make a biaxially oriented film having desirable properties.

Related disclosures include U.S. Pat. Nos. 7,052,750; 5,691,043; 6,908,687; 6,113,996; U.S. Patent Application Publication Nos. 2011/0268979; 2011/0212338; 2009/0220757; 2008/248229; 2005/214557; and 2003/0068453; EP 1 423 408; EP 1 300 238; and EP 1 632 343; and WO 2009/142805 and WO 2005/097493.

SUMMARY OF THE INVENTION

The invention provided herein is a film comprising at least one core layer sandwiched between at least two skin layers, the layers comprising (or consisting essentially of) a core layer comprising (or consisting essentially of) polypropylene and within the range of from 20 wt % or 25 wt % or 30 wt % to 35 wt % or 40 wt % or 45 wt % or 50 wt %, by weight of the materials in the core layer, of an propylene-α-olefin elastomer having within the range of from 5 wt % or 6 wt % or 8 wt % to 12 wt % or 16 wt % or 20 wt % or 25 wt % α-olefin derived units, by weight of the copolymer; and skin layers comprising one or more polymers having a melting point within the range of from 125° C. or 130° C. to 150° C. or 160° C., a Shore D Hardness within the range of from 55 or 56 to 65 or 70, and a Flexural Modulus (ISO 178) of at least 600 MPa or 650 MPa; wherein the film has a Haze value of less than 5% or 8% or 10%, and wherein the MD dimensional stability value is less than −10% or −20% or −30% or −40% (15 sec at 135° C.), and a TD dimensional stability value within the range of from −2% or −1% or 0% to 2% or 4% or 8% (15 sec at 135° C.).

Also, the invention is a method of forming a biaxially oriented film comprising at least one core layer sandwiched between at least two skin layers, the method comprising co-extruding a core layer comprising polypropylene and within the range of from 20 wt % or 25 wt % or 30 wt. % to 35 wt. % or 40 wt % or 45 wt % or 50 wt %, by weight of the materials in the core layer, of a propylene-α-olefin elastomer having within the range of from 5 wt % or 6 wt % or 8 wt % to 12 wt % or 16 wt % or 20 wt % or 25 wt % α-olefin derived units, by weight of the copolymer; and skin layers comprising a polymer having a melting point within the range of from 125° C. or 130° C. to 150° C. or 160° C., a Shore D Hardness within the range of from 55 or 56 to 65 or 70, and a Flexural Modulus (ISO 178) of at least 500 MPa or 600 MPa or 650 MPa; forming at least a three-layer film; stretching the film twice in the MD, the first stretch being within the range of from 2.5 to 6.5 ratio at from 80° C. to 120° C., and the second stretch being within the range of from 1.2 to 1.5 ratio at from 140° C. to 180° C.; and stretching the film once in the TD simultaneous with or after the first MD stretch and before the second MD stretch; wherein the MD dimensional stability value is less than −10% or −20% or −30% or −40% (15 sec at 135° C.), and a TD dimensional stability value within the range of from −2% or 0.5% to 6% or 8% (15 sec at 135° C.).

The various descriptive elements and numerical ranges disclosed herein can be combined with other descriptive elements and numerical ranges to describe preferred embodiments of the invention(s); further, for a given element, any upper numerical limit can be combined with any lower numerical limit described herein.

DETAILED DESCRIPTION

The present invention is directed to unilaterally shrinkable films and methods of making them. This is accomplished in one embodiment by stretching the film in both the machine direction (MD) and transverse direction (TD) and a second simultaneous or consecutive stretch in either the MD or TD, preferably the MD. For a film to be stretched a second time in the MD, the inventor has found that it should be flexible enough even after the first MD/TD orientation. Regular crystalline polypropylene alone will become very rigid after the normal MD/TD orientation. When going through the second MD, an oriented polypropylene film will break (tear/snap by MD force). Therefore, the inventor has found that there is a need to have present in the film a soft additive polymer to make the film more flexible (e.g., as a plasticizer to retard polypropylene crystallization). But it has been found that the additive should be sufficiently compatible with host polypropylene matrix. Thus, a propylene-based elastomer, or "propylene-α-olefin elastomer," having certain desirable properties as described herein has been found to be useful.

Further, the second MD orientation (MDO) will stretch the film to a maximum rigidity. If too high a level of soft additive is added to the film, the film will become too soft even after the second MDO, giving low stability. A high level of additive may also make the film easy to break during second MDO (e.g., film surface/metal friction may cause film tear). Thus, there is a balance of the amount of propylene-based elastomer that is useful to make unilaterally shrinkable film.

Thus, provided herein is a biaxially oriented polypropylene film comprising at least one core layer sandwiched between at least two skin layers, the layers comprising (or consisting essentially of) a core layer comprising (or consisting essentially of) polypropylene and within the range of from 20 wt % or 25 wt % or 30 wt % to 35 wt % or 40 wt % or 45 wt % or 50 wt %, by weight of the materials in the core layer, of a propylene-α-olefin elastomer having within the range of from 5 wt % or 6 wt % or 8 wt % to 12 wt % or 16 wt % or 20 wt % or 25 wt % α-olefin derived units, by weight of the copolymer; and skin layers comprising one or more polymers having a melting point within the range of from 125° C. or 130° C. to 150° C. or 160° C., a Shore D Hardness within the range of from 55 or 56 to 65 or 70, and a Flexural Modulus (ISO 178) of at least 600 MPa or 650 MPa; wherein the film has a Haze value of less than 5% or 8% or 10%, and wherein the MD dimensional stability value is less than 40% or −20% or −30% or −40% (15 sec at 135° C.); and a TD dimensional stability value within the range of from −1% or 0% to 2% or 4% or 8% (15 sec at 135° C.), thus, "uniaxially" shrinkable.

By "consisting essentially of" what is meant is that the film or layer referred to only includes as effective polymer components the named polymers but can also include up to 1 wt % or 2 wt % or 3 wt % or 4 wt % or 5 wt % of an additive as described further below, those additives not changing the properties of the film or layer as described/claimed herein. In particular embodiments, the films and/or layers consist of the named polymer components.

Preferably, the films of the invention have at least 2 layers, and more preferably at least 3 layers, and most preferably at least 5 layers. The films typically have at least two skin layers that are bound to the core on one face, and are unbound (face away from the film) on the other face. In certain embodiments of the invention, the skin layer(s) can be bound directly to the core, with no tie-layer in between. In other embodiments, there is a tie layer between each core layer and each skin layer that are otherwise adjacent to one another in the structure. If each skin layer is labeled "S", and each core layer labeled "C", and each tie layer labeled "T", then preferable film structures include, but are not limited to SCS, STC, STCT, STCTS, SSTCTS, STSCTSTS, SSTCCTSS, STSTCCTSTS, STTCTTS, SSSTCTS, SSTCTS, and other such structures. In the films described herein, each individual skin layer may be the same or different, preferably the same, in composition compared to other skin layers in the same film. Also, each core layer may be the same or different, and each tie layer may be the same or different. Thus, for example, the film structures above might be represented by $S^1T^1CT^2S^2$, $S^1S^2T^1CT^2S^1$, etc., wherein "$S^1$" and "$S^2$" are distinct from one another, meaning that they comprise different materials, and/or the same materials but in different ratios. The same is true for "$T^1$" and "$T^2$". Preferably, however, each skin layer, tie layer, and core layer that makes up a film will have a similar or identical identity, as this type of structure allows the use of only three extruders to melt blend and extrude the materials that form each layer of the film.

As used herein, the term "layer" refers to each of the one or more materials, the same or different, that are secured to one another in the form of a thin sheet or film by any appropriate means such as by an inherent tendency of the materials to adhere to one another, or by inducing the materials to adhere as by a heating, radiative, chemical, or some other appropriate process. The term "layer" is not limited to detectable, discrete materials contacting one another such that a distinct boundary exists between the materials. Preferably, however, the materials used to make one layer of a film will be different (i.e., the weight percent of components, the properties of each component, and/or the identity of the components may differ) from the materials used to make an adjacent, and adhering, layer. The term "layer" includes a finished product having a continuum of materials throughout its thickness. The "films" described herein comprise three or more layers, and may comprise 3, 4, 5, or more layers in particular embodiments.

The 3, 4, 5, 6, or more layer film structures (films) may be any desirable thickness, and in certain embodiments have an average thickness within the range of from 20 μm or 30 μm or 40 μm to an upper limit of 50 μm or 60 μm or 80 μm or 100 μm or 150 μm or 200 μm or 500 μm. Thus, an exemplary average thickness is within the range of from 30 μm to 80 μm.

As mentioned, the core layer will comprise a polypropylene, described further herein, and a soft propylene-based polymer or "propylene-α-olefin elastomer." These components can be described any number of ways, but, preferably, the polypropylene has a Vicat softening temperature (ISO 306, or ASTM D 1525) of greater than 120° C. or 110° C. or 105° C. or 100° C.; and the propylene-α-olefin elastomer has a Vicat softening temperature of less than 120° C. or 110° C. or 105° C. or 100° C. Described another way, the softening temperature of the polypropylene is at least 5° C. or 10° C. or 15° C. or 20° C. or 30° C. higher than the softening temperature of the propyiene-α-olefin elastomer. If the propylene-α-olefin elastomer does have a measurable melting point (ASTM D3418), then preferably it has a melting point of 5° C. or 10° C. or 15° C. or 20° C. or 30° C. or 40° C. lower than the polypropylene. Preferably, the core layer of the films herein will comprise or consist of polypropylene and one or more propylene-α-olefin elastomers. Most preferably, syndiotactic polypropylene is absent from the core layer.

Desirably, the films of the invention are biaxially oriented and uniaxially shrinkable. Preferably, the film has an MD shrinkage of at least 5% or 10% or 15% or 25% at 143° C., or stated another way, a dimensional stability at 143° C. of less than −5% or −10% or −15% or −25%. And preferably, the film has no TD shrinkage or expands (has a dimensional stability) to −2% or −1% or 0% to 2% or 4% or 8% at 143° C. The films of the invention also have other desirable properties, for instance, the films preferably have a Modulus (ASTM 882) in the MD within the range of from 100 kpsi or 120 kpsi to 250 kpsi or 300 kpsi or 350 kpsi; and a Modulus in the TD within the range of from 100 kpsi or 150 kpsi to 300 kpsi or 350 kpsi or 400 kpsi or 450 kpsi. Also, the films described herein preferably have a Guriey stiffness (ASTM D6125-97 (2007)) in the MD within the range of from 8 mg or 10 mg to 18 mg or 20 mg or 24 mg; and a Guriey stiffness in the TD within the range of from 8 mg or 10 mg to 25 mg or 30 mg or 35 mg.

The materials that comprise each layer of the films described herein are elucidated by, but not limited to, the embodiments described below.

Core Layer Polypropylene.

The "polypropylene" that is preferably used in the core layer is a homopolymer or copolymer comprising from 60 wt % or 70 wt % or 80 wt % or 85 wt % or 90 wt % or 95 wt % or 98 wt % or 99 wt % to 100 wt % propylene-derived units (and comprising within the range of from 0 wt % or 1 wt % or 5 wt % to 10 wt % or 15 wt % or 20 wt % or 30 wt. % or 40 wt % $C_2$ and/or $C_4$ to $C_{10}$ α-olefin derived units) and can be made by any desirable process using any desirable catalyst as is known in the art, such as a Ziegler-Natta catalyst, a metallocene catalyst, or other single-site catalyst, using solution, slurry, high pressure, or gas phase processes. Polypropylene copolymers are useful polymers in certain embodiments, especially copolymers of propylene with ethylene and/or butene, and comprise propylene-derived units within the range of from 70 wt % or 80 wt % to 95 wt % or 98 wt % by weight of the polypropylene. In any case, useful polypropylenes have a melting point (ASTM D3418) of at least 125° C. or 130° C. or 140° C. or 150° C. or 160° C., or within a range of from 125° C. or 130° C. to 140° C. or 150° C. or 160° C. A "highly crystalline" polypropylene is useful in certain embodiments, and is typically isotactic and comprises 100 wt % propylene-derived units (propylene homopolymer) and has a relatively high melting point of from greater than (greater than or equal to) 140° C. or 145° C. or 150° C. or 155° C. or 160° C. or 165° C.

The term "crystalline," as used herein, characterizes those polymers which possess high degrees of inter- and intra-molecular order. Preferably, the polypropylene has a heat of fusion (Hf) greater than 60 J/g or 70 J/g or 80 J/g, as determined by DSC analysis. The heat of fusion is dependent on the composition of the polypropylene; the thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer. Also, the polypropylenes useful herein may have a glass transition temperature (ISO 11357-1, $T_g$) preferably between −20° C. or −10° C. or 0° C. to 10° C. or 20° C. or 40° C. or 50° C. Preferably, the polypropylenes have a Vicat softening temperature (ISO 306, or ASTM D 1525) of greater than 120° C. or 110° C. or 105° C. or 100° C., or within a range of from 100° C. or 105° C. to 110° C. or 120° C. or 140° C. or 150° C., or a particular range of from 110° C. or 120° C. to 150° C.

Preferably, the polypropylene has a melt flow rate ("MFR", 230° C., 2.16 kg, ASTM D1238) within the range of from 0.1 g/10 min or 0.5 g/10 min or 1 g/10 min to 4 g/10 min or 6 g/10 min or 8 g/10 min or 10 g/10 min or 12 g/10 min or 16 g/10 min or 20 g/10 min. Also, the polypropylene may have a molecular weight distribution (determined by GPC) of from 1.5 or 2.0 or 2.5 to 3.0 or 3.5 or 4.0 or 5.0 or 6.0 or 8.0, in certain embodiments. Suitable grades of polypropylene that are useful in the oriented films described herein include those made by ExxonMobil, LyondellBasell, Total, Borealis, Japan Polypropylene, Mitsui, and other sources.

Propylene-Based Elastomers.

To improve certain properties of the polypropylene and/or core film layer, especially highly crystalline polypropylene, it is desirable to add an agent that, is miscible with the polypropylene but adds some softness to the film. The inventor has found propylene-α-olefin elastomers useful. As used herein, a "propylene-α-olefin elastomer" refers to a random copolymer that is elastomeric, has moderate crystallinity and possesses propylene-derived units and one or more units derived from ethylene, higher α-olefins, and/or optionally diene-derived units. One or a mixture of different propylene-α-olefin elastomers may be present in the core compositions, preferably only one. The propylene-based elastomers are copolymers of propylene having an intermediate amount, of α-olefin, such as within a range of from 5 wt % or 8 wt. % or 10 wt % or 12 wt. % to 18 wt % or 20 wt % or 22 wt % or 25 wt % α-olefin derived units. In a particular embodiment, where more than one comonomer is present, the amount of a particular comonomer may be less than 5 wt %, but the combined comonomer content is greater than 5 wt %. The propylene-α-olefin elastomers may be described by any number of different parameters, and those parameters may comprise a numerical range made up of any desirable upper limit with any desirable lower limit as described herein.

Preferably, the propylene-α-olefin elastomer comprises ethylene or $C_4$-$C_{10}$ α-olefin-derived units (or "comonomer-derived units") within the range of 5 wt % or 7 wt % or 9 wt % to 13 wt % or 16 wt % or 18 wt % or 20 wt % or 25 wt %, by weight of the elastomer. The propylene-α-olefin elastomer may also comprise two different comonomer-derived units. Also, these copolymers and terpolymers may comprise diene-derived units as described below. Preferably, the propylene-α-olefin elastomer comprises propylene-derived units and comonomer units selected from ethylene, 1-hexene, and 1-octene. And, more preferably, the comonomer is ethylene and, thus, the propylene-α-olefin elastomer is a propylene-ethylene copolymer. When dienes are present, the propylene-α-olefin elastomer comprises less than 5 wt % or 3 wt %, by weight of the elastomer, of diene derived units, or within the range of from 0.1 wt. % or 0.5 wt % or 1 wt. % to 5 wt % in other embodiments. Suitable dienes include, for example: 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

These propylene-α-olefin elastomers may have some isotactic polypropylene sequences but they also have some amorphous regions in the polymer chains, thus imparting desirable qualities to them and the compositions in which they are blended. Preferably, the propylene-α-olefin elastomers have a melting point of less than 110° C. or 100° C. or 90° C. or 80° C.; and within the range of from 10° C. or 15° C. or 20° C. or 25° C. to 65° C. or 75° C. or 80° C. or 95° C. or 105° C. or 110° C. in other embodiments. In certain embodiments, the propylene-α-olefin elastomers have no discernable melting point but are better described by their Vicat softening temperature. Whether the copolymers have a melting point or not, the propylene-α-olefin elastomers preferably have a Vicat softening temperature (ISO 306, or ASTM D 1525) of less than 120° C. or 110° C. or 105° C. or 100° C., or within a range of from 50° C. or 60° C. to 110° C. or 120° C., or a very particular range of from 70° C. or 80° C. to 100° C. or 110° C. Preferably, the softening point of the polypropylene used in the core is at least 5° C. or 10° C. or 15° C. or 20° C. higher than the softening point of the propylene-α-olefin elastomers used as a core additive.

Preferably, the propylene-α-olefin elastomers have a heat of fusion ($H_f$), determined according to the Differential Scanning Calorimetry (DSC) procedure described herein, within the range of from 0.5 J/g or 1 J/g or 5 J/g to 35 J/g or 40 J/g or 50 J/g or 65 J/g or 75 J/g. In certain embodiments, the $H_f$ value is less than 75 J/g or 60 J/g or 50 J/g or 40 J/g. Preferably, the propylene-α-olefin elastomers have a percent crystallinity within the range of from 0.5% to 40%, and from 1% to 30% in another embodiment, and from 5% to 25% in yet another embodiment, wherein "percent crystallinity" is determined according to the DSC procedure described herein. The thermal energy for the highest order of polypropylene is estimated at 189 J/g (i.e., 100% crystallinity is equal to 189 J/g).

Preferably, the propylene-α-olefin elastomers have a melt flow rate ("MFR," ASTM D1238, 2.16 kg, 230° C.), within the range of from 0.5 g/10 min or 1 g/10 min or 1.5 g/10 min or 2 g/10 min to 4 g/10 min or 6 g/10 min or 12 g/10 min or 16 g/10 min or 20 g/10 min in other embodiments.

Preferably, the molecular weight distribution (MWD) of the propylene-α-olefin elastomers is within the range of from 1.5 or 1.8 or 2.0 to 3.0 or 3.5 or 4.0 or 5.0. Techniques for determining the molecular weight (Mn, Mz, and Mw) and molecular weight distribution (MWD) are as follows and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981).

The propylene-α-olefin elastomers described herein can be produced using any catalyst and/or process known for producing polypropylenes. In certain embodiments, the propylene-α-olefin elastomers can include copolymers prepared according to the procedures in WO 02/36651; U.S. Pat. No. 6,992,158; and/or WO 00/01745. Preferred methods for producing the propylene-α-olefin elastomers are found in U.S. Patent Application Publication 2004/0236042 and U.S. Pat. No. 6,881,800. Preferred propylene-α-olefin elastomers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan), or certain grades of Clyrell™ and/or Softel™ (LyondellBasell Poly olefins of the Netherlands).

Skin Layer Materials.

Preferably, the one or both skin layers in the films of the invention may include (or consist essentially of, or consist of) a polymer that is suitable for heat-sealing or bonding to itself when crimped between heated crimp-sealer jaws. Desirable polymers that make up the skin layers have a DSC melting point of from 120° C. or 125° C. or 130° C. to 150° C. or 160° C., a Shore D Hardness within the range of from 55 or 56 to 65 or 70, and a Flexural Modulus (ISO 178) of at least 500 MPa or 600 MPa or 650 MPa, or in another embodiment within the range of from 400 MPa or 500 MPa or 600 MPa to 800 MPa or 900MPa or 1000 MPa or 1500 MPa or 2000 MPa. Commonly, suitable skin layer polymers include copolymers or terpolymers of ethylene, propylene, and butylene (EPB terpolymer) and may have DSC melting points of less than 140° C. or 135° C., or within a range of from 100° C. to 135° C. or 140° C. In some preferred embodiments, the skin layers may also comprise a polymer selected from propylene homopolymer, ethylene-propylene copolymer, butylene homopolymer and copolymer, ethylene vinyl acetate (EVA), metailocene-catalyzed propylene homopolymer, polyethylene (low, linear low, medium or high), and combinations thereof. An example of a suitable EPB terpolymer is Japan Polypropylene Corp. propylene-based terpolymer 7510. In a particular embodiment, the skin layers consist essentially of one or more propylene-ethylene copolymers or propylene-ethylene-butylene terpolymers.

Heat sealable blends of polymers can be utilized in the first, second, or both skin layers in the inventive films. Thus, along with the skin layer polymers identified above there can be, for example, other polymers, such as polypropylene homopolymer, for example, one that is the same as, or different from, the polypropylene of the core layer. The first skin layer may additionally or alternatively include materials selected from the group consisting of ethylene-propylene random copolymers, low-density polyethylene (LDPE), linear low density polyethylene (LLDPE), medium density polyethylene (MDPE), and combinations thereof.

Preferably, the first, second, or both skin layers comprise at least one polymer selected from the group consisting of a polyethylene (PE) polymer or copolymer, a polypropylene polymer or copolymer, an ethylene-propylene copolymer, an EPB terpolymer, a propylene-butylene (PB) copolymer, and combinations thereof. Preferably, the PE polymer is high-density polyethylene (HDPE), such as HD-6704.67 (Exxon-Mobil Chemical Company), M-6211 or HDPE M-6030 (Equistar Chemical Company). A suitable ethylene-propylene copolymer is Fina 8573 (Total). Preferred EPB terpolymers include Japan Polypropylene 7510 and 7794 (Japan Polypropylene Corp.). For coating and printing functions, the first skin layer may preferably comprise a copolymer that has been surface treated.

The skin layer can also comprise (or consists essentially of) a styrenic block copolymer. Desirable polymers will have a density within the range of from 0.850 g/cc or 0.860 g/cc or 0.870 g/cc to 0.930 g/cc or 0.940 g/cc or 0.960 g/cc or 1.000 g/cc or 1.050 g/cc (ISO 1183). Preferably, the styrenic block copolymers comprise from 15 wt % or 20 wt % or 25 wt % to 35 wt % or 40 wt % or 45 wt % or 50 wt % styrenic derived units, by weight of the copolymer. Preferably, the styrenic block copolymer is a styrene-ethylene/butylene-styrene terpolymer having a melt flow rate (MFR, ASTM D 1238, 230° C. at 2.16 kg) of from 0.5 g/10 min or 1 g/10 min or 2 g/10 min or 3 g/10 min to 6 g/10 min or 8 g/10 min or 10 g/10 min or 12 g/10 min. Desirable styrenic block copolymers may be SEBS or SBBS Tuftec™ styrenic elastomers from Asahi Kasei Chemicals; Chevron Phillips K-Resins™; and Kraton™ D or G Elastomers.

The styrenic block copolymer may comprise from 50 wt % or 60 wt % or 70 wt % to 90 wt % or 100 wt %, by weight of the skin layer materials, of the skin layer. The skin layer may consist essentially of, or consist of, the styrenic block copolymer, but when other materials are present, skin layer materials or core layer materials may make up a portion or all of the remainder, especially in three-layer films with no tie-layers. Preferably, the skin layer(s) is made from a blend of the styrenic block copolymer and the ethylene-based polymers described above, the latter being present in the skin layer within a range of from 5 wt % or 10 wt % or 20 wt % to 40 wt. % or 50 wt. %, by weight of the skin layer.

Additives.

Additives may be present in one or more layers of the multi-layer films of this disclosure. Typically, the additives are present, if at all, at a level of from 0.1 wt. %) or 0.5 wt % to 1 wt % or 2 wt. % or 3 wt % or 5 wt %, by weight of the materials in the given layer. In some cases, such as for cavitating or opacifying agents, the amounts can be within the range of from 5 wt % to 10 wt % or 15 wt % or 20 wt % or 30 wt %, by weight of the given layer. Examples of additives include, but are not limited to, opacifying agents, pigments, colorants, cavitating agents, slip agents, antioxidants, anti-fog agents, anti-static agents, anti-block agents, fillers, moisture barrier additives, gas barrier additives, and combinations thereof. Such additives may be used in effective amounts, which vary depending upon the application and the property desired.

Examples of suitable opacifying agents, pigments or colorants include iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be within the range of from 0.1 µm to 2 µm or 3 µm or 5 µm or 8 µm or 10 µm. Cavitation may also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer may also comprise a beta-crystalline nucleating agent. Substantially any beta-crystalline nucleating agent ("beta nucleating agent" or "beta nucleator") may be used.

Slip agents may include higher aliphatic acid amides, higher aliphatic acid esters, waxes, silicone oils, and metal soaps. Such slip agents may be used in amounts ranging from about 0.1 wt % to about 2 wt %, based on the total weight of the layer to which it is added. An example of a slip additive that may be useful is erucamide.

Non-migratory slip agents, used in one or more skin layers of the multi-layer films, may include polymethyl methacrylate (PMMA). The non-migratory slip agent may have a mean particle size in the range of from about 0.5 µm to about 8 µm, or about 1 µm to about 5 µm, or about 2 µm to about 4 µm, depending upon layer thickness and desired slip properties. Alternatively, the size of the particles in the non-migratory slip agent, such as PMMA, may be greater than about 20% of the thickness of the skin layer containing the slip agent, or greater than about 40% of the thickness of the skin layer, or greater than about 50% of the thickness of the skin layer. The size of the particles of such non-migratory slip agents may also be at least about 10% greater than the thickness of the skin layer, or at least about 20% greater than the thickness of the skin layer, or at least about 40% greater than the thickness of the skin layer. Generally spherical, particulate non-migratory slip agents are contemplated, including PMMA resins, such as Epostar™ (commercially available from Nippon Shokubai Co., Ltd.), Other commercial sources of suitable materials are also known to exist. "Non-migratory" means that these particulates generally do not change location throughout the layers of the film in the manner of migratory slip agents. A conventional polydialkyl siloxane, such as silicone oil or gum additive having a viscosity of about 10,000 to about 2,000,000 centistokes is also contemplated.

Suitable anti-oxidants may include phenolic anti-oxidants, such as Irganox™ 1010 (Ciba-Geigy Company). Such an anti-oxidant is generally used in amounts ranging from about 0.1 wt % to about 2 wt %, based on the total weight of the layer(s) to which it is added.

Anti-static agents may include alkali metal sulfonates, polyether-modified polydiorganosiloxanes, polyalkylphenyisiloxanes, and tertiary amines. Such anti-static agents may be used in amounts ranging from about 0.05 wt % to about 3 wt %, based upon the total weight of the layer(s).

Examples of suitable anti-blocking agents may include silica-based products such as Sylobloc™ 44 (Grace Davison Products), PMMA particles such as Epostar (Nippon Shokubai Co., Ltd.), or polysiloxanes such as Tospearl™ (GE Bayer Silicones). Such an anti-blocking agent comprises an effective amount up to about 3000 ppm of the weight of the layer(s) to which it is added.

Fillers may include finely divided inorganic solid materials, such as silica, fumed silica, diatomaceous earth, calcium carbonate, calcium silicate, aluminum silicate, kaolin, talc, bentonite, clay, wollastonite, and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be compounded with a wax or coated with a wax-containing coating, for lubricity, in amounts ranging from about 2 wt % to about 15 wt % based on the total weight of the skin layer. Any conventional wax, such as, but not limited to, Camauba™ wax (commercially available from Michelman Corporation) and Be Square™ wax (commercially available from Baker Hughes Corporation) that is useful in thermoplastic films is contemplated.

Process of Producing.

It is preferred that all layers of the multilayer film structures of the present invention be eoextruded, after which the film can be biaxially oriented (primary orientation) and thereafter secondarily oriented in the direction in which shrinkability is desired. Co-extrusion can be carried out in a multilayer melt form through a fiat die. Orientation steps can be effectuated by the use of rollers and/or tenter clips as is known in the art.

Preferably, the films are first stretched in the machine direction (MD) at a stretching ratio of from 2.5 or 3 or 4 to 6 or 6.5 at a temperature of 80° C. to 120° C. Next, the film is stretched in the transverse direction (TD) at a stretching ratio of from 4 or 6 to 10 or 12 at a temperature of from 100° C. to 125° C. Finally, the film is stretched a second time in the MD at a stretching ratio of from 1.2 to 1.3 or 1.4 or 1.5 or 2.0 at a temperature of from 140° C. to 180° C. the film cooled to below 100° C. after each stretching step in certain embodiments. In a particular embodiment, the film is not cooled after the TD stretch.

In order to minimize TD contraction which can adversely affect second direction heat stability, for example, MD heat stability, it is desirable to maintain a minimal distance between the stretching rollers used in MD orientation. Such distances can be less than 30 cm, for example, from 5 cm to 10 cm. The resulting uniaxially shrinkable film, after secondary orientation, can range in thickness from 10 µm to 64 µm (0.4 mils to 2.4 mils), preferably 20 µm to 56 µm (0.8 mils to 2.2 mils).

The films of the present invention can also be prepared by orienting on a line which utilizes linear motors to directly propel opposed pairs of tenter clips synchronously. The film can be primarily oriented by synchronously accelerating along a diverging path, directly opposed pairs of tenter clips holding the film, thus, achieving simultaneous biaxial orientation. Secondary MD orientation on the same tenter can be effected along a parallel path subsequent to the diverging path by simultaneously accelerating the directly opposed pairs of tenter clips along some portion of the parallel path.

The equipment used for film stretching can be a factor in how the stretching ratios are set. For a LISIM line, for example, the stretch ratio is controlled by clip roller speed. During the first MDO, the film web is moving forward at increasing speed with a set of parallel clips. In the same large oven during TDO, the film is stretched in a divergent angle at high steady speed. Then, after reaching the maximum and/or desired TDO, the film will be moving at increased speed going through the second MDO. All these MD/TD/MD processes in LISIM equipment are done in sequence in the same oven with no cooling. Each orientation zone however may have different temperature settings.

On the other hand, film from a sequential orientation would be cooled during each orientation step, A base sheet is quenched into a solid sheet first. The solid sheet is heated to a temperature sufficient enough to be stretched in MD (MDO process). Then, the MDO sheet is cooled slightly and then reheated again in the preheat zone of TD oven. There is always a gap/space between exit of MDO and entry point of TDO. The line operator would need this space to handle the web going through each section. A scrap winder is usually stationed between MDO and TDO to wind the MDO sheet during start-up. For an LISIM line, there would be no space between MDO and TDO.

Thus, provided herein is a method of forming a biaxially oriented polypropylene film comprising at least one core layer sandwiched between at least two skin layers, the method comprising co-extruding a core layer comprising polypropylene and within the range of from 20 wt % to 50 wt %, by weight of the materials in the core layer, of a propylene-$\alpha$-olefin elastomer having within the range of from 5 wt % or 6 wt % or 8 wt % to 12 wt % or 16 wt % or 20 wt % or 25 wt. % $\alpha$-olefin derived units, by weight of the copolymer; and skin layers comprising a polymer having a melting point within the range of from 125° C. or 130° C. to 150° C. or 160° C., a Shore D Hardness within the range of from 55 or 56 to 65 or 70, and a Flexural Modulus (ISO 178) of at least 500 MPa or 600 MPa or 650 MPa; forming at least a three-layer film; stretching the film twice in the MD, the first stretch being within the range of from 2.5 to 6.5 ratio at from 80° C. to 120° C., and the second stretch being within the range of from 1.2 to 1.5 ratio at from 140° C. to 180° C.; and stretching the film once in the TD simultaneous with or after the first MD stretch and before the second MD stretch; wherein the MD dimensional stability value is less than −10% or −20% or −30% or −40% (15 sec at 135° C.), and a TD dimensional stability value within the range of from −2% or 0.5% to 6% or 8% (15 sec at 135° C.). The film may have other desirable properties as described herein.

Preferably, the film is stretched in the TD after the first MD stretch but before the second MD stretch at a ratio of from 4 or 6 to 10 or 12. And in yet another embodiment, the film is simultaneously stretched the first. MD and the TD at a ratio of from 4 or 6 to 10 or 12, followed by stretching again in the MD.

The resulting uniaxially MD shrinkable film exhibits greater than 15% shrinkage, preferably greater than 18% shrinkage or even 25% or more shrinkage in the MD, after 7 minutes of exposure to a temperature above 130° C. However, at temperatures at or below about 50° C., a shrinkage in the same direction of less than 3%, preferably less than 2%, after seven days is obtained. The films described herein can exhibit ±8% stability, preferably −2% to +4% stability or +6% or +8% stability in the direction perpendicular to that of the secondary MD orientation (i.e., TD). Stability of −2% to +4% or +6% or +8% means that the dimension of the film perpendicular to the direction of secondary orientation, after heating to a temperature above 130° C. shrinks no more than, for example, 2% or expands no greater than 4% of the original dimension of the film at room temperature.

The higher temperature range given in the preceding paragraph is typical for the application of labels to containers. The lower temperature range is typical for the storage of film rolls prior to label application. Hence, the shrinkage behavior described ensures good conformance of labels to containers but minimizes defects due to excessive shrinkage in roll form.

As mentioned, the films preferably are biaxially oriented, but only substantially shrinkable in the MD. By "substantially" what is meant is that there is little to no expansion or shrinkage of the film in the TD upon heating as described above. The films described herein also have other favorable properties such as a desirable Modulus (MD and TD), Gurley Stiffness (MD and TD), haze, and other properties. The films are very useful in forming so-called roll-on-shrink-on labels for articles such as bottles, etc. A "label" is simply a film as described herein having printing thereon, preferably on a skin surface, more preferably a skin surface that has been chemically and/or physically treated as is known in the art.

The following are non-limiting examples of the embodiments of the invention described herein.

EXAMPLES

The core component of the films used to demonstrate the invention are ExxonMobil™4612 polypropylene homopolymer having a melt flow rate (ASTM D1238, 230° C., 2.16 kg) of about 3 g/10 min, a 1% Secant Modulus MD of about 119 kpsi and TD of about 116 kpsi, and a melting point of about 161° C. A first propylene-$\alpha$-olefin elastomer ($\alpha$-PP1) is Vistamaxx™ 3980 from ExxonMobil having an MFR of 8 g/10 min, a melting point of 79° C., a Tensile Strength of about 2700 psi, and a Flexural Modulus of 15.4 kpsi. A second propylene-$\alpha$-olefin elastomer ($\alpha$-PP2) is Clyrell™ RC1890 from LyondellBasell, having a MFR of 2.5 g/10 min, a Vicat softening temperature (ISO 306) of 110° C., and a Tensile Modulus (ISO 527-1) of 500 MPa. As a comparative example, Finapias™ 1471 (EOD 96-30) syndiotactic polypropylene (s-PP) from Total may be present.

The components of the skin layer of the films used to demonstrate the invention are JPP 7510, a C2/C3/C4 terpolymer from Japan Polypropylene Corporation, MFR=5.7 g/10 min and a melting point of 130° C., and Topas™ 8007-F04, a cyclic olefin copolymer (COG) by Topas, has a glass transition temperature of 78° C. (ISO 11357-1, -2, -3). Up to about 1 wt % of Be Square™ Wax 195 may be added to the skin layers.

The core component(s) (polypropylene and the additive in Table 1) are melted in an extruder with a screw of L/D ratio of 20/1 to provide the core layer. A second and third extruder, in association with the first extruder, is supplied with the skin layer materials as listed in Table 1 to provide the two skin layers. A melt co-extrusion is carried out while maintaining the barrel of the core polymer material extruder at a temperature sufficient to melt the polymer mixture, i.e., from 232° C.

to 288° C. (450° F. to 550° F.). The polymers to be extruded as skin layers are maintained in the second extruder and third extruders at about the same temperature as the components used in fabricating the core layer. The two streams of skin layer material of the second and third extruders enable the formation of skin layers on each surface of the core layer.

A three-layer film is coextruded with a core thickness representing about 92% of the overall extruded thickness, with the thickness of each skin layer representing about 4% of the film thickness. The resultant film sheet is subsequently stretched 4.5 times in the machine direction and 8 times in the transverse direction using a commercially available sequential biaxially orienting apparatus to provide a multi-layer film structure. The MD orientation is conducted at 127° C. (260° F.) and the TD orientation is conducted at a temperature of from 149° C. to 160° C. (300° F. to 320° F.). The resultant film is thereafter secondarily oriented in the MD direction by stretching on a series of five rollers heated at 110° C. to 121° C. (220° F. to 250° F.) directly after the TD orienter. Samples are collected which are secondarily oriented by MD stretching. Secondary MD stretch is measured as the percentage of increase in length of the film after secondary orientation, which is approximated by the percentage increase of roll speed.

After the secondary MD stretch the film is annealed by moderate heating. This can be done by means of an infrared (IR) heater and/or a pair of heated rollers. In addition, annealing can be accomplished by carrying out most of the secondary MD stretch further upstream in the above-mentioned series of five rollers and raising the temperature of the last one. The annealing conditions used in this Example are set forth in Tables 1 and 2.

In Table 1, the $1^{st}$ MDO and $2^{nd}$ MDO are MD stretch ratios. For dimensional stability (dim stab), the "-" means shrinkage and no sign means film growth or expansion. Percent "haze" measurements of the film are before heat shrinkage and after heat shrinkage. Low haze would be preferred especially after shrinkage.

Some of the examples demonstrate the difficulty in making this type of MD stretch film. In the three-layered films of Table 1, ExxonMobil 4612 polypropylene is the predominant component of the core layer, with varying amounts of additives in Samples 1 through 7. When increasing the second MDX speed to 1.3 (from 1.2) for Sample 7, web breakage occurred. The line was reset for a second MDO at 1.5, but breakage still occurred. With 30% Clyrell RC1890 (α-PP2) in core in Sample 6, operability is not as good as that with 30% Vistamaxx 3980 (α-PP1) in core. Web breakage with 1.3 second MDO stretch occurs. When COC is present in one skin layer (WB), as in Sample 5, light melt disturbance was observed on the water bath side of the film, opposite the cast-roll side. There was difficulty in stretching in the second MDO with one skin layer comprising COC. With COC in both skins in Sample 5, a 5/8 (MD/TD) orientation could be achieved, but could not be stretched post TDO. Further, web breakage was observed when stretched through second MDO section when COC is used as both skin layers. Skin cracks with delamination in Sample 4.

The term "Guriey stiffness" as used herein means the bending resistance of a flat sheet material by measuring the force required to bend a specimen under controlled conditions. The ASTM test is D6125-97.

The term "haze" as used herein refers to the percentage of incident light that is transmitted through a film that is deflected or scattered more than 2.5 degrees from the incoming light direction. On the other hand, the term "light transmission" as used herein refers to percentage of incident light that passes through a film. The haze for a film may be measured with a spectrophotometer or haze meter using ASTM D 1003. In one or more embodiments, the haze value of the film is ≤35%. In other embodiments, the haze is less than or equal to 20%, or 18%, or 15%, or 12%, or 10%, or 8%, or 5%, or 3%, or 2%.

TABLE 1

Sample Compositions and Testin Resuits

| Sample No. | Skins | PP + additive core | $1^{st}$ MDO | $2^{nd}$ MDO | yield in²/lb | dim stab 135° C., 15 sec | | % haze | |
|---|---|---|---|---|---|---|---|---|---|
| | | | | | | MD % | TD % | before | after |
| 1 | JPP-7510 | 10% s-PP | 4.5 | 1.20 | 14868 | −20.0 | 3.3 | 7.5 | 4.6 |
| 2 | JPP-7510 | 10% α-PP1 | 4.5 | 1.20 | 14318 | −20.7 | 4.7 | 5.8 | 1.7 |
| 3 | JPP-7510 | 30% α-PP1 | 4.5 | 1.20 | 14809 | −23.7 | 1.7 | 7.3 | 2.1 |
| | | | 5.0 | 1.20 | 14750 | −24.0 | 1.7 | 6.8 | 1.8 |
| | | | 5.0 | 1.22 | 14711 | −25.0 | 1.0 | 7.6 | 1.9 |
| | | | 5.0 | 1.26 | 14778 | 26.7 | 2.3 | 8.0 | 2.4 |
| | | | 5.0 | 1.30 | 14526 | −28.0 | 5.0 | 8.3 | 2.3 |
| 4 | 8007F04 | 30% α-PP1 | 5.0 | 1.30 | 15837 | −28.3 | 5.3 | 14 | 23 |
| 5 | 8007F04 | 30% α-PP2 | 5.0 | 1.2 | — | — | — | — | — |
| | 8007F04 | 30% α-PP2 | 5.0 | 1.0 | — | — | — | — | — |
| 6 | JPP-7510 | 30% α-PP2 | 5.0 | 1.2 | 15069 | −23.3 | 2.3 | 7.3 | 3.4 |
| | | | 5.0 | 1.3 | 15417 | −27.3 | 5 | 7.6 | 3 |
| | | | 5.0 | 1.29 | 15466 | −27.3 | 3.3 | 8.7 | 2.6 |
| 7 | JPP-7510 | 10% α-PP2 | 5.0 | 1.2 | 15144 | −21.3 | 2 | 5.2 | 2.0 |

TABLE 2

Detailed Dimensional Analysis and Modulus Tests of Samples

| Sample No. | ga. mil | Modulus (kpsi) MD | Modulus (kpsi) TD | Gurley Stiffness MD | Gurley Stiffness TD | lab Haze % | dim stab/MD, % (° C.) 71 | 82 | 93 | 104 | 116 |
|---|---|---|---|---|---|---|---|---|---|---|---|
| 1 | 2.21 | 237 | 339 | 14 | 23.4 | 7.0 | −4.2 | −7 | −9.3 | −8.3 | −15 |
| 2 | 2.17 | 219 | 296 | 16.8 | 23.6 | 5.4 | −4.7 | −7.7 | −7.2 | −9.5 | −17 |
| 3 | 2.12 | 133 | 170 | 11.6 | 12.8 | 8.9 | −5.3 | −9.3 | −15 | −19 | −24 |
| 4 | 1.94 | 131 | 169 | 8.7 | 16.5 | 15.3 | −6.7 | −6.2 | −18 | −22 | −25 |
| 5 | 2.24 | 209 | 277 | 14 | 19.4 | 5.0 | −5.5 | −8.7 | −7.2 | −15 | −18 |
| 6 | 2.14 | 220 | — | 15.1 | 16.5 | 7.6 | −5.5 | −9 | −7.8 | −17 | −17 |
| 7 | 2.14 | 272 | 353 | 16.6 | 25.1 | 3.6 | −5.7 | −8.2 | −5.5 | −8.2 | −16 |

| Sample No. | dim stab/MD, % (° C.) 127 | 135 | 143 | dim stab/TD, % (° C.) 71 | 82 | 93 | 104 | 116 | 127 | 135 | 143 |
|---|---|---|---|---|---|---|---|---|---|---|---|
| 1 | −17 | −19 | −20 | 1.33 | 2 | 2.5 | 2.83 | 3.67 | 3.67 | 2.5 | 0.67 |
| 2 | −18 | −19 | −21 | 1.67 | 2.33 | 3 | 4 | 4.17 | 4 | 2.67 | 1 |
| 3 | −25 | −27 | −28 | 1.67 | 2.33 | 3.5 | 4 | 4.33 | 3.67 | 2.17 | −2.3 |
| 4 | −27 | −28 | −29 | 2.17 | 3.67 | 5 | 5.17 | 5.17 | 4.17 | 3.33 | 0.83 |
| 5 | −20 | −21 | −23 | 1.67 | 2.67 | 3.33 | 3.67 | 4 | 3.17 | 1.67 | −3.8 |
| 6 | −24 | −25 | −27 | 2 | 2.83 | 4 | 4.67 | 4.17 | 5 | 3.67 | −2 |
| 7 | −18 | −19 | −21 | 1.67 | 2.5 | 3.5 | 4 | 3.5 | 4 | 2.5 | −2.5 |

The invention claimed is:

1. A film comprising at least one core layer sandwiched between at least two skin layers, the layers comprising:
   (i) a core layer comprising polypropylene and within the range of from 20 wt % to 50 wt %, by weight of the materials in the core layer, of a propylene-α-olefin elastomer having within the range of from 5 wt % to 25 wt % α-olefin derived units, by weight of the copolymer; and
   (ii) skin layers comprising one or more polymers having a melting point within the range of from 125° C. to 160° C., a Shore D Hardness within the range of from 55 to 70, and a Flexural Modulus (ISO 178) of at least 500 MPa; wherein the film has a Haze value of less than 10%, and wherein the MD dimensional stability value is less than −10% (15 sec at 135° C.), and a TD dimensional stability value within the range of from −2% to 8% (15 sec at 135° C.).

2. The film of claim 1, wherein the polypropylene has a Vicat softening temperature (ISO 306, or ASTM D 1525) of greater than 100° C.; and the propylene-α-olefin elastomer has a Vicat softening temperature of less than 120° C.

3. The film of claim 1, wherein the Vicat softening temperature of the polypropylene is at least 5° C. higher than the Vicat softening temperature of the propylene-α-olefin elastomer.

4. The film of claim 1, wherein the film has an MD shrinkage of at least 10% at 143° C.

5. The film of claim 1, wherein the film has no TD shrinkage or expands (has a dimensional stability) from −1% to 8% at 143° C.

6. The film of claim 1, wherein syndiotactic polypropylene is absent from the core layer.

7. The film of claim 1, wherein ethylene-based copolymers, those copolymers having at least 60 wt % ethylene derived units, are absent from the core layer.

8. The film of claim 1, wherein the skin layers consisting essentially of one or more propylene-ethylene copolymers or propylene-ethylene-butylene terpolymers.

9. The film of claim 1, wherein the film has a Modulus in the MD within the range of from 100 kpsi to 350 kpsi; and a Modulus in the TD within the range of from 100 kpsi to 450 kpsi.

10. The film of claim 1, wherein the film has a Gurley stiffness in the MD within the range of from 8 mg to 24 mg; and a Gurley stiffness in the TD within the range of from 8 mg to 35 mg.

11. The film of claim 1, wherein the film is biaxially oriented and uniaxially shrinkable.

12. An article comprising the film of claim 1 wrapped circumferentially around a container.

13. A method of forming a biaxially oriented film comprising at least one core layer sandwiched between at least two skin layers, the method comprising co-extruding:
   (i) a core layer comprising polypropylene and within the range of from 20 wt % to 50 wt %, by weight of the materials in the core layer, of a propylene-α-olefin elastomer having within the range of from 5 wt % to 25 wt % α-olefin derived units, by weight of the copolymer; and
   (ii) a first skin layer comprising a polymer having a melting point within the range of from 125° C. to 160° C., a Shore D Hardness within the range of from 55 to 70, and a Flexural Modulus (ISO 178) of at least 500 MPa; and
   (iii) a second skin layer comprising a polymer having a melting point within the range of from 125° C. to 160° C., a Shore D Hardness within the range of from 55 to 70, and a Flexural Modulus (ISO 178) of at least 500 MPa; forming at least a three-layer film;
   stretching the film twice in the MD, the first stretch being within the range of from 2.5 to 6.5 ratio at from 80° C. to 120° C., and the second stretch being within the range of from 1.2 to 1.5 ratio at from 140° C. to 180° C.; and
   stretching the film once in the TD simultaneous with or after the first MD stretch and before the second MD stretch;
   wherein the MD dimensional stability value is less than −10% (15 sec at 135° C.), and a TD dimensional stability value within the range of from −2% to 8% (15 sec at 135° C.).

14. The method of claim 13, wherein the film is stretched in the TD after the first MD stretch but before the second MD stretch at a ratio of from 4 to 12.

15. The method of claim 13, wherein the film has an MD shrinkage of at least 10% at 143° C.

16. The method of claim 13, wherein the film has no TD shrinkage or expands to less than 8% at 143° C.

17. The method of claim 13, wherein syndiotactic polypropylene is absent from the core layer.

18. The method of claim 13, wherein each skin layer independently consist essentially of one or more propylene-ethylene copolymers or propylene-ethylene-butylene terpolymers.

19. The method of claim 13, wherein the film has a Modulus in the MD within the range of from 100 kpsi to 350 kpsi; and a Modulus in the TD within the range of from 100 kpsi to 450 kpsi.

20. The method of claim 13, wherein the film has a Gurley stiffness in the MD within the range of from 8 mg to 24 mg; and a Gurley stiffness in the TD within the range of from 8 mg to 35 mg.

21. The method of claim 13, wherein the polypropylene has a Vicat softening temperature (ISO 306, or ASTM D 1525) of greater than 100° C.; and the propylene-a-olefin elastomer has a Vicat softening temperature of less than 120° C.

22. The method of claim 13, wherein the film is biaxially oriented.

23. The method of claim 13, wherein the film is simultaneously stretched in the MD and the TD at a ratio of from 4 to 12, followed by stretching again in the MD.

24. A method of making an article comprising wrapping a film made in accordance with the method of any one of numbered claim 13 around a container.

\* \* \* \* \*